(12) United States Patent
Pastuch

(10) Patent No.: US 6,844,495 B2
(45) Date of Patent: Jan. 18, 2005

(54) WEATHER-PROOF SPRING POST

(76) Inventor: Darrell Pastuch, 391 W. Riverside Dr., Tequesta, FL (US) 33469

( * ) Notice: Subject to any disclaimer, the term of this patent is extended or adjusted under 35 U.S.C. 154(b) by 0 days.

(21) Appl. No.: 10/673,637

(22) Filed: Sep. 29, 2003

(65) Prior Publication Data

US 2004/0118585 A1 Jun. 24, 2004

Related U.S. Application Data

(60) Provisional application No. 60/415,285, filed on Oct. 1, 2002.

(51) Int. Cl.[7] ............................................. H02G 3/08
(52) U.S. Cl. .................. 174/65 R; 174/135; 174/68.1; 174/72 A; 248/560; 248/565
(58) Field of Search ................ 174/48, 65 R, 174/68.1, 68.3, 72 A, 72 R, 135, 95, 21 R, 24, 72 C, 37, 45 R, 43, DIG. 8; 385/135, 134; 248/68.1, 548, 560, 565, 566, 906, 900, 160; 138/177, 96 T, 173, 154, 118; 285/244, 256, 382, 903; 362/390, 382

(56) References Cited

U.S. PATENT DOCUMENTS

| | | | | |
|---|---|---|---|---|
| 4,854,416 A | * | 8/1989 | Lalikos et al. ............. | 138/173 |
| 4,992,629 A | * | 2/1991 | Morais ....................... | 174/135 |
| 5,039,011 A | | 8/1991 | Parker ......................... | 239/1 |
| 5,520,222 A | * | 5/1996 | Chikama ..................... | 138/118 |
| 5,538,294 A | * | 7/1996 | Thomas ...................... | 285/903 |
| 5,626,418 A | * | 5/1997 | Angelis et al. ............. | 362/390 |
| 6,092,555 A | * | 7/2000 | Otsuka ....................... | 138/118 |
| 6,508,277 B1 | * | 1/2003 | Imes et al. .................. | 138/177 |

* cited by examiner

Primary Examiner—Dean A. Reichard
Assistant Examiner—Angel R. Estrada
(74) Attorney, Agent, or Firm—McHale & Slavin, PA

(57) ABSTRACT

A substantially flexible post having a hollow tubular inner sheath protruding upwardly from the earth and having a first end portion and a second end portion. The first end portion of the fixture post is connected to an electrical junction box disposed in a subterranean location, the second end portion connected to an electrical fixture attached thereto, such that the electrical conductors pass from the electrical junction box, through the inner sheath portion thus safely communicating electrical energy from the junction box to the fixture. Additionally, a spring comprising a coil of wire, wherein the spring surrounds the outer diameter of the sheath portion. The length dimension of the flexible inner sheath portion is longer than the length dimension of the spring.

16 Claims, 3 Drawing Sheets

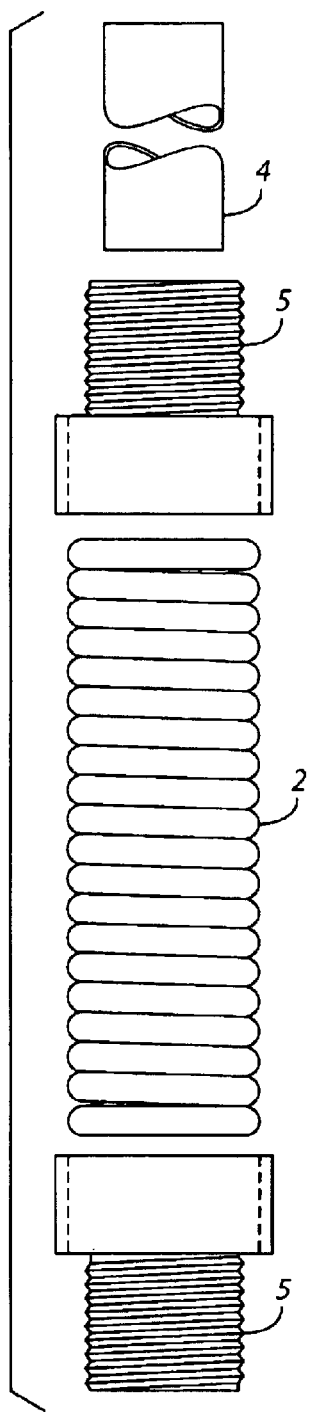
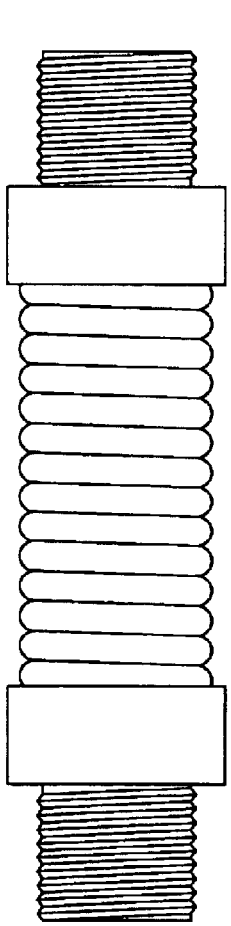
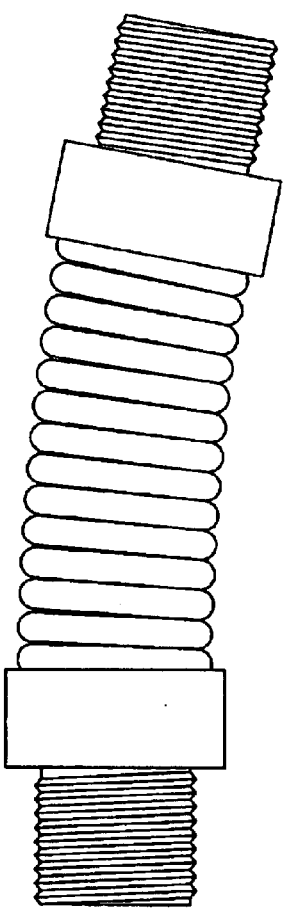
*FIG. 3*     *FIG. 4*     *FIG. 5*

WEATHER-PROOF SPRING POST

CROSS-REFERENCES TO RELATED APPLICATIONS

This application claims the benefit of U.S. Provisional Application No. 60/415,285 filed Oct. 1, 2002, currently still pending, the entire contents of which are herein incorporated by reference.

TECHNICAL FIELD

This invention relates to an article of manufacture useful in the electrical accessory field. More particularly, it relates to a supporting member upon which lamps and other electrical accessories may be mounted.

BACKGROUND INFORMATION

Electrical fixtures and other wares which are designed to be used in outdoor locations require provisions for their support in the location at which they are employed, as well as provisions for supplying them with the electrical energy required for their use. Often, such fixtures comprise lamp posts which are designed to protrude upwardly from the earth. One common type of lamp post are those which are designed to illuminate a driveway in a residential setting, which driveway lamp posts protrude upwardly from the ground to provide an incandescent or other source of illumination disposed at about 10 to 36 inches above the ground. Such fixtures typically comprise a light bulb socket surrounded by a sconce or shroud disposed at the first end of a hollow, linear conduit having its second end cemented into the ground using a portland cement based material. The wires used to supply electrical energy pass through the hollow interior of the conduit, which conduit thus serves the dual purpose of housing the electrical supply wires and providing support for the lamp socket. However, such constructions suffer the serious drawback for cases where they are impacted, for example by a motorist whose vehicle, through oversight, causes such lamp post to be struck with their vehicle with sufficient force to bend or break the conduit at the base where it is cemented into the earth. In the case of such mishaps, repair of the fixture requires extensive work, including removal of the cement and replacement of the conduit. Additionally, there may be serious risks associated with the electrical wires being exposed by such incidents, which may be compounded by the fact that the place where the conduit is broken typically represents a sharp enough edge to sever the insulation from the electrical supply wires it houses, which can in some cases result in the conduit itself becoming the hot pole of a 110 VAC electrical potential. In such a scenario, a life-threatening situation exists for anyone passing by who views the damage, and attempts to pick up the fixture to inspect the damage and assess repairs. Similar damages to such light fixtures and other protruding electrical appliances may be caused by oversights by personnel operating lawn mowing equipment that strikes the fixtures. Thus, if there was available a means for absorbing the physical shock of an impact of such a fixture by an automobile, lawnmower, or other source of force without permitting breakage of the conduit at its base, not only would such means alleviate the need for repairs, but it would also increase the overall safety level of operating such electrical fixtures, by reducing the likelihood of breach of the insulation of the electrical conductors housed within the conduit. The present invention provides such a means.

SUMMARY OF THE INVENTION

The present invention provides a device useful for supporting electrical fixtures which comprises: a spring means comprising a coil of a flexible wire, wherein said spring means has an outer diameter, an inner diameter, a first end portion, a second end portion and a length dimension; and an inner sheath portion having a first end portion, a second end portion, a length dimension, an inner diameter and an outer diameter. According to a preferred form of the invention, the outer diameter of said sheath portion smaller than the inner diameter of the spring means, and wherein said sheath portion is disposed within said spring means, said length dimension of said flexible inner sheath portion being longer than said length dimension of said spring means.

BRIEF DESCRIPTION OF THE DRAWINGS

In the annexed drawings:

FIG. 3 is an exploded perspective view of a spring post according to another embodiment of the invention, FIG. 4 shows an assembled spring cost according to the present invention, FIG. 5 is a perspective view showing flexing of the spring post illustrated in FIG. 4.

DETAILED DESCRIPTION

Figure 1:
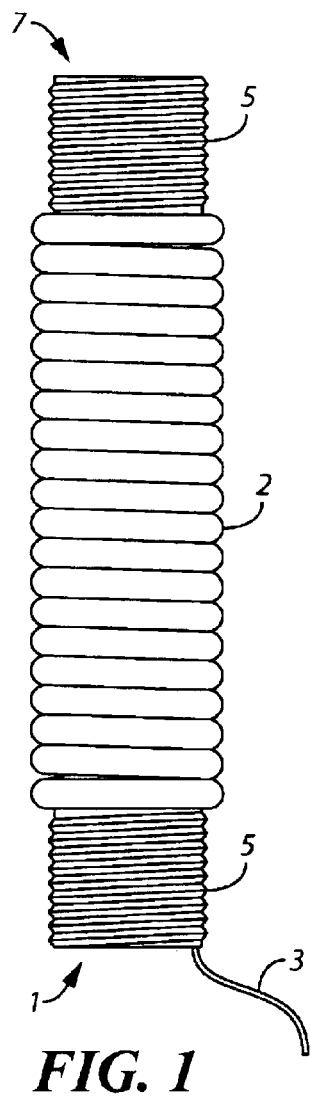
FIG. 1 is a perspective view of a spring post according to one embodiment of the invention.

Referring to the drawings and initially to FIG. 1 there is shown a spring post according to one embodiment of the invention. A spring post of the invention generally comprises an inner flexible tubular sheath portion 4 (FIGS. 2, 3) that is disposed within a flexible spring means 2. The flexible tubular sheath portion 4 is disposed within the hollow cylindrical space defined by the wound wire construction of the spring means 2, so that the axis of the tubular sheath portion substantially coincides with the axis of the cylindrical volume defined by the spring means. The flexible sheath portion has a first end portion 1 and a second end portion 7. Preferably the flexible tubular sheath portion 4 is a continuous construct of tubular configuration which is waterproof, and is preferably made from a thermoplastic material such as PVC or polyolefin such as polypropylene homopolymer, or copolymer. However, other materials are sufficient for the fabrication of the flexible sheath portion inasmuch as they are known to those skilled in the art as being capable of protecting electrical wiring disposed within its confines from the normal weather elements, including rain, snow, etc.

According to one preferred form of the invention, the first end portion 1 and the second end portion 7 of the flexible tubular sheath portion 4 comprise male threads on their end portions. Such a provision enables the first end portion 1 of a spring post according to the invention to be screwed into a cooperatively connecting female thread which is an integral part of an existing electrical junction box 8 (FIG. 6) which is disposed in a set location, including subterranean locations. Then, the second end portion 7 is attached to the first end of a linear conduit, which serves as a post, wherein a lighting fixture 9 (FIG. 6) is secured to the second end of the linear conduit. Electrical conductors (not shown) are then fed through the linear conduit, from the junction box 8 to the fixture 9, and the fixture 9 may then be energized. Such an arrangement provides an illuminated post which protrudes vertically upward from the ground and can be used to line a driveway in a residential setting, with the new advantage being that if such a construction is stricken either by a lawnmower or motorized vehicle, the post will bend instead of break at its base, by virtue of the post being mounted to the ground by way of the spring means 2.

In an alternate form of the invention, the first end portion 1 and the second end portion 7 of the flexible sheath portion comprise female threaded ends. The invention also contemplates one of the end portions 1, or 7 to have female threads and the remaining end portion to comprise male threads. FIG. 1 also shows a ground wire 3 affixed to one of the threaded end portions, to provide a source of electrical ground to the device when in use.

The spring means 2 has a fixed inner diameter which is adapted to receive the flexible sheath portion. Preferably, the inner diameter of the spring means defines a tubular cavity having a diameter which is less than the outer diameter of the sheath means. Such a feature permits the spring means to be flexed without damage to the flexible sheath portion, and especially to electrical conductive wires passing through the sheath portion.

Figure 6:
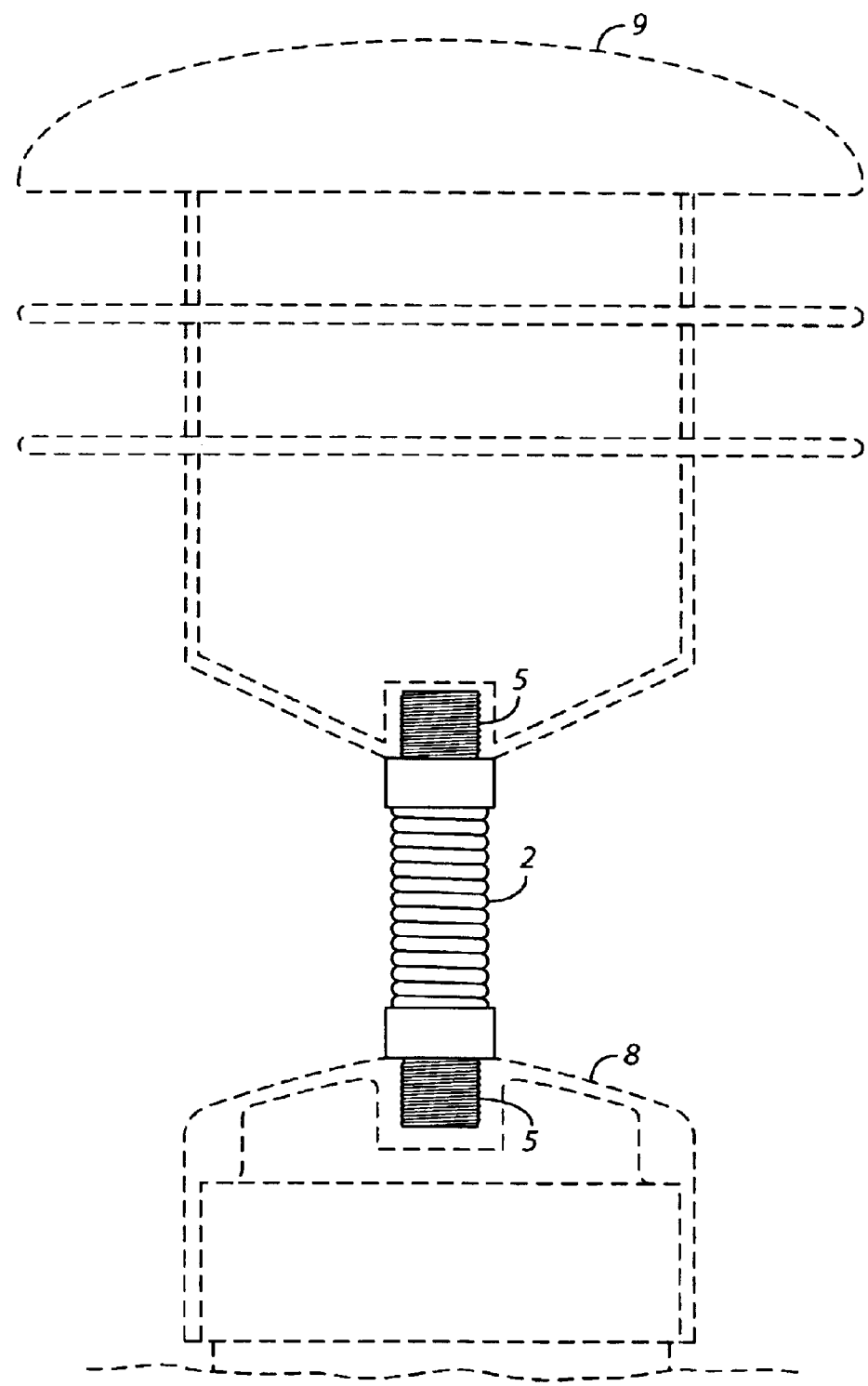
FIG. 6 is a perspective view illustrating the electrical junction box in a subterranean location connected to the flexible sheath portion and a lighting fixture.

In one embodiment shown in FIG. 6 of the present, invention, the first end portion of the weather-proof spring post is screwed into or otherwise affixed to a junction box 8 located in a subterranean location. Then, a light fixture 9 such as a lamp is affixed to the second end portion of the weather-proof spring post. Optionally, there may be a pole (not shown) disposed between the lamp and the second end portion. Electrical conduits (not shown) supplying electrical service to the lamp means pass through the flexible sheath means. Thus, a lamp post which is secured to a junction box 8 or other fixture at about the ground level is resistant to being detrimentally deformed by an impact, such as by a lawn-mowing apparatus, a bicycle collision, or being hit by a car. In each of these instances, the lamp post merely flexes, instead of breaking, as is the case with prior-art mounting means for lamps and the like. The present invention comprises the use of electrical fixtures other than lamps at the second end portion of the weather-proof spring means.

The invention contemplates situations where the outer diameter of the flexible sheath portion is less than the inner diameter of the spring means by any amount between 0.10 inches and 10.00 inches, including every 0.01 inches therebetween.

Generally, the spring means is flexible, but is constructed of spring steel of sufficient gauge to provide structural rigidity to a lamp or other appendage affixed to the second end portion.

Figure 2:
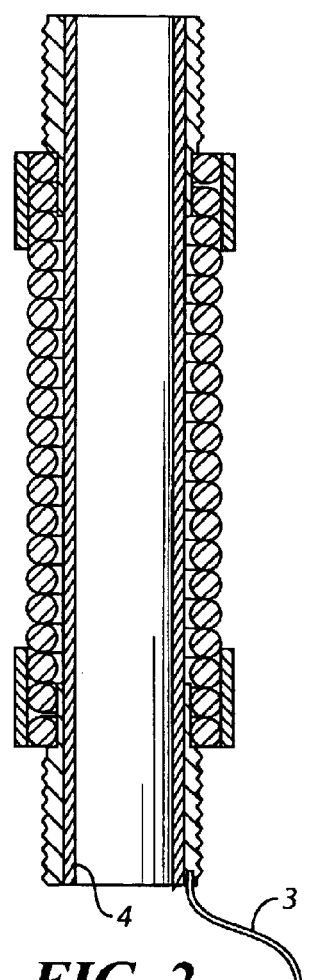
FIG. 2 is a cross section view of a spring post according to one embodiment of the invention.

FIG. 2 shows a cutaway view of a spring post according to the invention with the flexible sheath 4 shown inside.

FIG. 3 shows an exploded view of the spring post according to the invention as shown in FIG. 2 with the exception of having female threaded ends 5 rather than male threaded ends as in at 1 of FIG. 2.

FIG. 4 shows a spring post according to the invention as shown in FIG. 3 with the exception of having non-metallic or plastic ends, which may be affixed to an electrical fixture of the prior art using conventional means, wherein the fixture may comprise a lamp or other fixture, or a junction box.

FIG. 5 is a view showing the flexible sheath means 4 disposed within the spring means 2.

FIG. 6 is a perspective view showing the spring cost of the present invention affixed via male or female threads 5 to an electrical fixture 9 of the prior art using any conventional means. i.e. lamp, and a junction box 8 in a subterranean location.

The present invention includes the use of an alloy of iron, including steels and the like, as materials of construction for the first and second end portions of the inner sheath portion. The present invention also includes the use of polymeric materials, such as polyolefins, polyurethanes, or other organic polymers known in the art as materials of construction for the first and second end portions of the inner sheath portion.

One preferred form of the present invention comprises an inner sheath portion that is of unitary construction, that is, where the end portions of the inner sheath portion are an integral part of the same construct as the inner sheath portion, such as when the inner sheath is made from a plastic injection molding process from a polymer such as a polyolefin homopolymer or copolymer.

The present invention contemplates the situations where the end portions of the inner sheath portion are separate from the inner sheath portion. In such embodiments, the inner sheath portion is substantially tubular in configuration. The threaded end portions in such embodiment are affixed directly to the first and second end portions of the spring means, such as by welding, adhesives, or fasteners, wherein the first and second threaded end portions are affixed to the spring means or otherwise connected thereto using conventional fastening means known to those skilled in the art for joining metallic wares to one another.

According to an alternate form of the invention, a device of the invention has its spring means rigidly affixed to at least one of said first end portion or said second end portion of said sheath portion. When the end portion of the sheath which is intended to be connected to a subterranean junction box is rigidly affixed to the spring means, it may be affixed to the spring by any conventional means, including adhesives, pins, screws, rivets, etc. Such provision provides added strength to the construction as a whole. When the end portion of the sheath that is not intended to be connected to a subterranean conduit, i.e., that end which is intended to be connected to an electrical fixture, or to a conduit having an electrical fixture disposed at its end, is rigidly affixed to the spring means, it may again be affixed to the spring by any conventional means, including adhesives, pins, screws, rivets, etc. Such provision also provides added strength to the construction as a whole. According to an alternate form of the invention, a device of the invention has its spring means rigidly affixed to both of said first end portion and said second end portion of said sheath portion.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. Accordingly, the presently disclosed invention is intended to cover all such modifications and alterations, and is limited only by the scope of the claims which follow.

I claim:

1. A device useful for supporting electrical fixtures which comprises:

a) a spring means comprising a coil of wire, wherein said spring means has an outer diameter, an inner diameter, a first end portion, a second end portion and a length dimension, and wherein said spring means defines a cylindrically shaped space in its interior, b) a tubular inner sheath portion having a first end portion, a second end portion, a length dimension, an inner diameter and an outer diameter; and c) an electrical junction box connected to said first end portion of said inner sheath portion, wherein the outer diameter of said sheath portion is smaller than the inner diameter of the spring means, and wherein said sheath portion is disposed within the cylindrical space within said spring means, said length dimension of said flexible inner sheath portion being longer than said length dimension of said spring means.

2. A device according to claim 1 further comprising an electrical fixture disposed at said second end portion of said inner sheath portion.

3. A device according to claim 2 wherein said electrical junction box is in a subterranean location, and wherein said electrical fixture is a lighting fixture.

4. A device according to claim 1 wherein at least one of said first end portion or said second end portion of said sheath portion includes threads.

5. A device according to claim 4 wherein said threads are selected from the group consisting of: male threads and female threads.

6. A device according to claim 1 wherein both of said first end portion and said second end portion of said sheath portion comprise threads selected from the group consisting of: male threads and female threads.

7. A device according to claim 1 wherein said spring means is rigidly affixed to at least one of said first end portion or said second end portion of said sheath portion.

8. A device according to claims 7 further comprising an electrical fixture disposed at said second end portion of said inner sheath portion.

9. A device according to claim 1 wherein said spring means is rigidly affixed to both of said first end portion and said second end portion of said sheath portion.

10. A device according to claim 9 further comprising an electrical fixture disposed at said second end portion of said inner sheath portion.

11. A device according to claim 1 wherein each of said first end portion and said second end portion of said sheath portion are smooth.

12. A device as in claim 1 wherein said wire is spring steel.

13. A device as in claim 1 wherein said first and said second end portions of said inner sheath portion are metallic being comprised of an alloy of iron including steels and the like.

14. A device as in claim 1 wherein said first and said second end portions of said inner sheath portion are made from a polymeric material such as a polyolefin, polyurethane, or other organic polymer known in the art.

15. An arrangement comprising a substantially linear fixture post having a hollow interior and protruding upwardly from the earth and having a first end portion and a second end portion, wherein said first end portion of said fixture post is connected to an electrical junction box disposed in a subterranean location by means of a device comprising:

a) a spring means comprising a coil of wire, wherein said spring means has an outer diameter, an inner diameter, a first end portion, a second end portion and a length dimension, and wherein said spring means defines a cylindrically shaped space in its interior; and b) a tubular inner sheath portion having a first end portion, a second end portion, a length dimension, an inner diameter and an outer diameter, wherein the outer diameter of said sheath portion is smaller than the inner diameter of the spring means, and wherein said sheath portion is disposed within the cylindrical space within said spring means, said length dimension of said flexible inner sheath portion being longer than said length dimension of said spring means, wherein said second end of said linear fixture post comprises an electrical fixture attached thereto, and wherein electrical conductors pass from said electrical junction box, through said inner sheath portion and through said hollow interior of said fixture post to said electrical fixture, thus communicating electrical energy from said junction box to said fixture.

16. An arrangement according to claim 15, wherein said fixture comprises a lamp, a speaker, or a bug zipper.

* * * * *